United States Patent Office
2,849,762
Patented Sept. 2, 1958

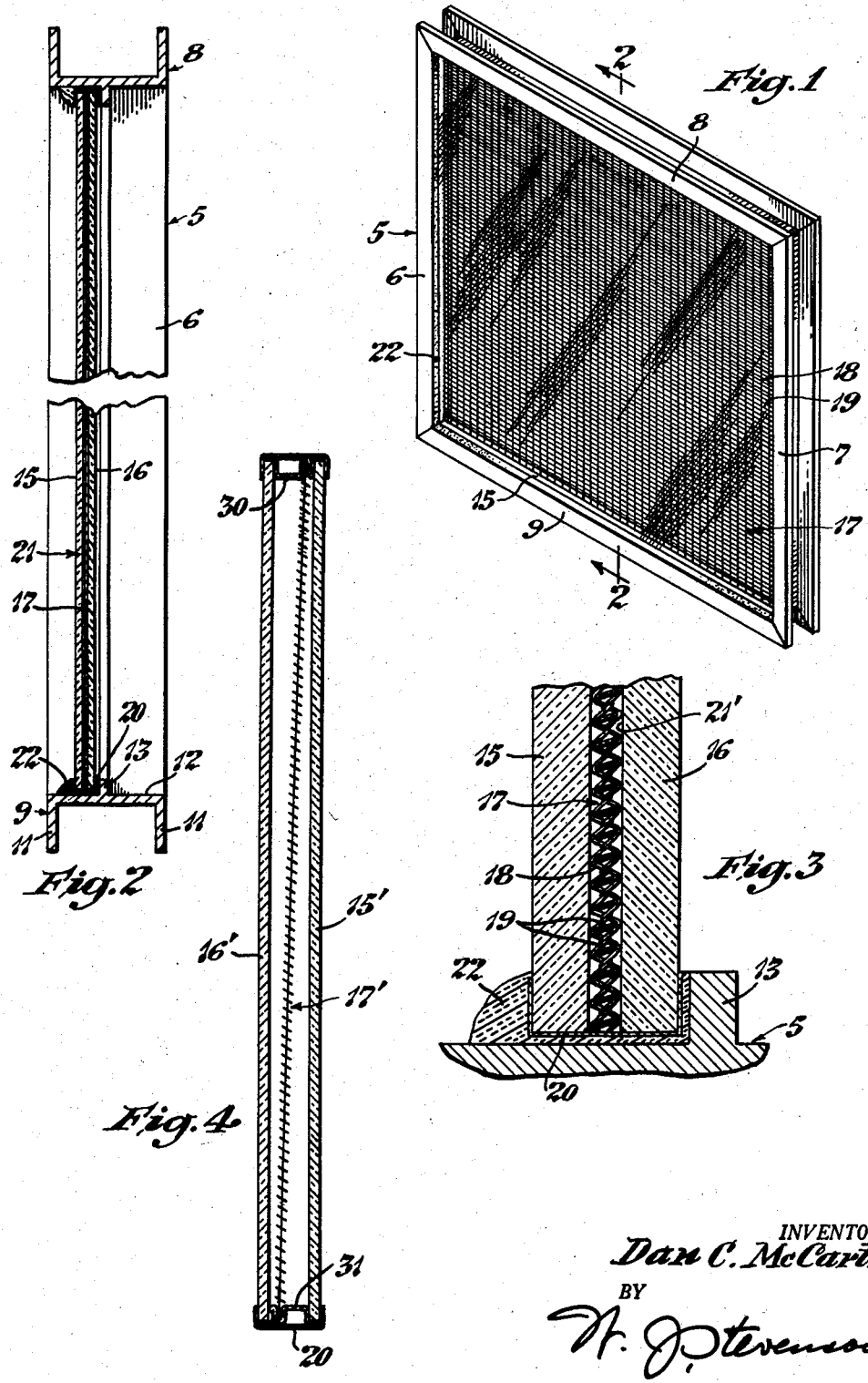

2,849,762

COMBINATION WINDOW AND SUN-PROOF SCREEN

Dan C. McCarthy, Burbank, Calif.

Application June 26, 1953, Serial No. 364,270

2 Claims. (Cl. 20—56.5)

This invention relates generally to the art of controlling the temperature of the air in a space, such as a room which normally is subjected to solar ray heat entering through windows and other glass openings. Specifically, the invention pertains to improvements in shading devices installed across said windows, or other openings, for blocking direct sun ray heat which would otherwise enter the room, such devices functioning to maintain the temperature within the room at a comfortable level while allowing transmission of glareless light into the room.

Various expedients have been proposed and used for shading windows for the purpose of controlling the degree of sun ray heat entering rooms through the windows, while allowing transmission of sufficient glareless, diffused light for complete and efficient visibility at all times. Such devices have included inside shades, inside Venetian blinds, outside Venetian blinds and outside awnings.

The shading of windows to reduce the admission of solar ray heat therethrough, while maintaining efficient transmission of light rays into the room and efficient visibility through the window, has long been a perplexing problem. However, the problems have been very satisfactorily overcome through the provision of a sun screen which is installed across the outside of the window and has extremely thin, narrow horizontally extending slats or louvers arranged at predetermined angles calculated in accordance with scientific data established through solar observations. That is to say, the slats of the screen are set at an angle calculated to admit graduated amounts of solar ray heat throughout the day as the angle of the sun varies throughout 180 degrees. To be more specific, the angle and spacing of the slats is such that during early morning, when the angles of declination of the sun rays are low, a relatively large amount of the solar ray heat and light are admitted through the window to provide a comfortable temperature within the room and efficient lighting.

As the angle of declination increases toward meridian, the solar rays strike the slats at gradually increasing impingement angles so that as the atmosphere becomes increasingly warmer, the amount of solar ray heat admitted to the room through the screen is gradually diminished in substantially direct proportion to the rise in atmospheric temperature due to more direct solar radiation. At the same time, the light rays entering the room are likewise gradually subdued to produce efficient and comfortable light, free from glare.

A slatted screen of the character referred to above has been generally accepted as a most satisfactory and efficient sun shading medium. However, such a screen has several disadvantages or deficiencies, one of which is that it impedes cleaning of the outside of the window across which it is installed. Another disadvantage resides in the fact that the fully exposed and unprotected components of the screen are subject to damage due to climatic conditions, such as rain, hail, sleet, etc. Moreover, such outside screens or shades, when constructed from serviceable materials, such as thin metal stock, are subject to corroding and other deterioration and it has been observed that discoloration of adjacent portions of the window frame frequently occurs. It is also a fact that the accumulation of dust on the slats may impair their ability to reflect a portion of the sun rays and, as will be apparent, during subsequent rain, the accumulated dust will be washed down onto portions of the building to detract from the appearance thereof. A still further disadvantage of such slatted screens is that the cost of their installation is relatively high, due to the necessity of providing special hangers and mounting devices for tensioning the slatted material, and to the labor costs involved in fitting the screens to window frames of various types and sizes.

The present invention was conceived as a means for overcoming the disadvantages and deficiencies outlined above, it being an important object of the invention to provide an improved slatted sun-proof screen or shade for use in controlling the transmission of solar ray heat through a window opening into a room, said shade having all the attributes of the conventional slatted screen referred to above and being fully protected against damage due to any cause, such as weather conditions, malfitting of the screen during its installation, unnecessary rough handling by window-washers, etc.

Another object is to provide an improved heat-and light-controlling screen structure in which the slatted screen is encased between two sheets of transparent material, for example between the glass panes of a double-pane window, the shade thus being fully protected against damage. By this structure, the slatted screen is unexposed so that the problems usually involved in washing the window are effectively avoided. In addition, deterioration of the metal material and accumulation of dust thereon are eliminated. Also, since the screen is enclosed, it may be made from less expensive material.

Another object of the invention is to provide a structure, of the class specified, in which the slatted screen material is retained in a truly flat or planar condition, free from wavy portions, by reason of the fact that the material fits snugly between the glass panes with its sides engaged by said panes.

Another object of the invention is to provide a window structure of alternative form in which the screen material may be stretched between the top and bottom rails of the window in the space existing between the panes of glass, said space being of greater width than the thickness of the material to allow setting the screen in a plane inclined with respect to the plane of the window as a whole. By this arrangement, the slats or louvers of the screen may be made to assume angles of inclination slightly greater or slightly less than the angle normally assumed when the screen is in true vertical position so that the slats may be adjusted in accordance with the path of the sun occurring at different latitudes.

A still further object of the invention is to provide a combination window and slatted sun-proof screen which is simple in construction and relatively economical to produce and install, one which is attractive in appearance, and one which is highly efficient in performing its intended function.

Further objects of the invention will appear from the following description and from the drawing which is intended for the purpose of illustration only, and in which:

Fig. 1 is a perspective view of the combination solar heat- and light-controlling window and shade structure;

Fig. 2 is an enlarged vertical sectional view through the structure, taken on line 2—2 of Fig. 1;

Fig. 3 is a further enlarged vertical section of a portion of the slatted screen and the two panes of glass; and Fig. 4 is a vertical sectional view through a combination window and screen structure of alternative form.

Referring first to Figs. 1 to 3 of the drawing, the improved window structure includes a frame 5 composed of stiles or side rails 6 and 7, a top rail 8 extending between the upper ends of the stiles and a bottom rail 9 extending between the lower ends of the stiles. As shown, the parts of the frame 5 may be made as aluminum alloy extrusions of substantially channel-shaped cross section to provide flanges 11 joined by a web 12, the section also having a bead or stop 13 projecting from the web. The stiles and rails of the frame 5 may be connected by any usual method and means. The metal window frame 5 herein shown, by way of example, is conventional and is installable in the window opening of a building in the usual manner.

The frame 5 carries a combination window pane and sun-proof screen. The window pane consists of two sheets or lights 15 and 16 of glass of suitable thickness, said sheets being spaced, as shown. Disposed between the two panes 15 and 16 is a sheet 17 of sun-proof screen material such as that previously referred to. The material 17 consists of a series of spaced verticals or upright wires 18, and a multiplicity of vertically spaced horizontal louvers or slats 19, the wires being made from stock of the order of .0113 inch diameter while the louvers are metal strips of approximately .0179 inch thickness by approximately $\frac{1}{16}$ inch wide. The wires 18 are looped over the edges of the louvers 19 and twisted together between the louvers as shown in Fig. 3. Such a screen is conventional and now in general use and therefore is not claimed per se herein.

The two panes or lights of glass 15 and 16 are placed against opposite sides of the screen material 17 with the longitudinal edges of the louvers in contact with the inner surfaces of the glass. The panes 15, 16 and the screen material 17 are retained in this assembled relation by means of a strong and durable, water-proof tape 20, known in the trade as S. R. 620 F. O. S. The combination glass-screen assembly 21 is thus a unitary structure having a hermetically sealed air space 21 between the panes 15 and 16, in which the screen material 17 is held. By binding the tape 20 firmly over the adjacent edges of the glass panes and folding it inwardly against the outer surfaces of the panes, the two sheets of glass are drawn tightly against the opposite sides of the material 17 so as to eliminate any wrinkles or curves which may be present therein, and to thus cause the material to assume a coplanar condition throughout its entire area.

The glass-screen unit 21 may be installed in a window frame, such as the frame 5 disclosed by way of example in the drawing, by first applying putty or other glazing compound 22 against the web 12 and the front face of the stop 13. The unit is then placed in the frame with the rear sides of the edge portions of the unit disposed against the stop 13, that is, against the putty coating 22. With the unit 21 in place, glazing compound 22 is placed along the intersection of the web 12 and the front face of the glass 15 and against the exposed portion of the tape 20 so as to seal the unit in place. The invention is not limited to the exact means for mounting the unit in the window frame since it may be secured in place by a metal strip screwed against the frame, as is the case in another form of metal window currently in use. It is to be noted that the unit 21 is installed in the window frame 5 in such manner that the louvers 19 slope downwardly at the side of the window which is to be exposed at the outside of the building.

With the combination window installed within the opening of the building, its louvers 19 serve as barriers against which the sun rays impinge to effectively reduce admission of the heat rays into the room lighted by the window, in other words, to reduce the B. t. u. gain due to solar radiation. Due to the scientifically calculated angle of inclination of the louvers, substantially full sunlight is admitted into the room during the early morning and late afternoon periods but transmission of the solar rays during the intermediate portion of the day is minimized. Thus, the louvers function to block the passage of the solar ray heat of greatest intensity so as to prevent undesirable increase in the temperature of the air within the room.

In addition, the dead air space 21 serves as an insulation to minimize the rate of heat exchange over that which normally occurs when a single pane of glass serves as the separator between the room and the atmosphere. It is to be seen, therefore, that when an air-conditioned building is involved, a smaller conditioning unit may be employed for the purpose and this obviously results in lower initial cost and reduced operating expenses in cooling the living or working space. In some instances, the air-refrigerating unit may remain inactive over long periods of time, with the air conditioning equipment functioning to merely change the air.

In a similar manner, during the winter months the double-pane window serves as a "storm" sash to minimize escape of heat from the room and to prevent steaming or fogging of the window, due to condensation of moisture produced by the widely varying temperatures at the opposite sides of the window. It is thus seen that the combination window sash and louvered screen makes for greater efficiency in maintaining a room at a comfortable temperature.

Referring now to Fig. 4, the invention also contemplates a sash-screen structure in which the panes 15' and 16' are spaced at a greater distance. In this structure, the louver screen 17' has its upper and lower edge portions gripped between crimped portions of bars 30 and 31, respectively. By locating the crimped portion of the upper bar 30 closer to the outer pane 15', the sheet of material 17' is caused to assume an outwardly inclined position, so as to increase slightly the angle of inclination of the louvers 19 while using the same conventional screen. Such increased tilting of the louvers may be found advantageous in certain latitudes.

In accordance with the provisions of the patent statutes, I have described the principle of my invention, together with the constructions and arrangements which I now consider to represent the best embodiments thereof, but I desire to have it understood that the devices shown are only illustrative and that the invention may be carried out by modified means. For example, while a louvered screen of particular type is shown, it is to be understood that other screens having similar characteristics are currently available and may be utilized to advantage.

I claim as my invention:

1. A combined window and sun screen structure, comprising: inner and outer rectangular window panes arranged in spaced, side-by-side relation; a sun screen interposed between said panes with clearance and having immovable, vertically spaced, horizontally extending, slanted louvers; sealing means extending around the perimeters of the panes and defining between the panes a dead air space, said panes and screen providing a unit for insertion in a window sash frame; and means carried at the upper and lower edges of the unit and engaging the respective upper and lower edges of the screen to maintain tension on the screen, said means including bars along the upper and lower edges of the unit to extend between and maintaining the panes in spaced relationship and having crimped portions gripping the edges of the screen related thereto, the crimped portion of the bar along the top edge of the unit occurring adjacent the inner pane and spaced from the outer pane and the crimped portion of the bar along the edge of the unit occurring adjacent the outer pane and spaced from the inner pane, whereby the screen is set in a plane inclined with respect to the plane of the panes.

2. A combined window and sun screen structure, comprising: inner and outer rectangular vertically disposed window panes arranged in spaced, side-by-side relation; a sun screen interposed between said panes with clearance and having immovable, vertically spaced, horizontally extending, slanted louvers; sealing means extending around the perimeters of the panes and defining between the panes a dead air space, said panes and screen providing a unit for insertion in a window sash frame; and means engaging the upper and lower edges of at least one of said panes and gripping the corresponding upper and lower edges of the screen to tension the screen, the said means including bars along the upper and lower edges of the unit, each bar having a portion to engage an edge of a pane and a portion to occur between the panes and crimped to grip the edge of the screen related thereto, said crimped portion of one of said bars being positioned in close proximity to one of said panes, and spaced from the other of said panes, the crimped portion of the other bar being in close proximity to said other pane and spaced from said first mentioned pane, whereby the screen is tensioned in a plane inclined with respect to the plane of the panes.

References Cited in the file of this patent

UNITED STATES PATENTS

| | | |
|---|---|---|
| 1,495,948 | Carney | May 27, 1924 |
| 1,982,351 | Phillips | Nov. 27, 1934 |
| 1,988,964 | Barrows | Jan. 22, 1935 |
| 2,088,738 | Fox | Aug. 3, 1937 |
| 2,094,435 | Toney | Sept. 28, 1937 |
| 2,194,222 | Ewing | Mar. 19, 1940 |
| 2,288,465 | Knudsen | June 30, 1942 |
| 2,340,411 | Chorpenning | Feb. 1, 1944 |
| 2,382,566 | Heckman | Aug. 14, 1945 |
| 2,539,079 | Holland | Jan. 23, 1951 |
| 2,545,906 | Watkins | Mar. 20, 1951 |
| 2,545,907 | Watkins | Mar. 20, 1951 |
| 2,618,819 | Goodwillie | Nov. 25, 1952 |
| 2,631,339 | Pratt | Mar. 17, 1953 |